(12) United States Patent
Lindoff et al.

(10) Patent No.: US 11,119,182 B2
(45) Date of Patent: Sep. 14, 2021

(54) COMMUNICATION NODE, TARGET DEVICE AND METHODS FOR ACTIVATION POSITIONING PROCEDURE IN WIRELESS COMMUNICATION NETWORK

(71) Applicant: Telefonaktiebolaget LM Ericsson (publ), Stockholm (SE)

(72) Inventors: Bengt Lindoff, Bjarred (SE); Gabor Fodor, Hasselby (SE); Fredrik Gunnarsson, Linkoping (SE); Jonas Kronander, Knivsta (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/472,845

(22) PCT Filed: Dec. 23, 2016

(86) PCT No.: PCT/EP2016/082630
§ 371 (c)(1),
(2) Date: Jun. 21, 2019

(87) PCT Pub. No.: WO2018/114011
PCT Pub. Date: Jun. 28, 2018

(65) Prior Publication Data
US 2020/0191901 A1   Jun. 18, 2020

(51) Int. Cl.
*G01S 5/00* (2006.01)
*H04B 17/318* (2015.01)
(Continued)

(52) U.S. Cl.
CPC .......... *G01S 5/0027* (2013.01); *G01S 5/0036* (2013.01); *G01S 5/0284* (2013.01); *G01S 19/34* (2013.01);
(Continued)

(58) Field of Classification Search
CPC .... G01S 5/0027; G01S 5/0036; G01S 5/0284; G01S 19/34; H04B 17/318; H04W 4/70;
(Continued)

(56) References Cited

U.S. PATENT DOCUMENTS 6,216,004 B1 * 4/2001 Tiedemann, Jr. ........................... H04W 52/0216
455/442
7,535,873 B1 * 5/2009 Sigg ...................... H04W 36/18
370/311
(Continued)

FOREIGN PATENT DOCUMENTS

DE    102010056278 A1    6/2012
KR    20080047841 A    5/2008
(Continued)

OTHER PUBLICATIONS

PCT International Search Report, dated Sep. 20, 2017, in connection with International Application No. PCT/EP2016/082630, all pages.
(Continued)

*Primary Examiner* — Ernest G Tacsik
(74) *Attorney, Agent, or Firm* — Leffler Intellectual Property Law, PLLC (57) ABSTRACT

A first communication node and method therein for activation of a positioning procedure for a target device in a wireless communication network are disclosed. The first communication node determines whether the target device has moved and activates a positioning procedure for the target device when the movement is larger than a threshold.

27 Claims, 7 Drawing Sheets

(51) Int. Cl.
*H04W 4/70* (2018.01)
*G01S 5/02* (2010.01)
*G01S 19/34* (2010.01)
*H04W 4/02* (2018.01)
*H04W 24/10* (2009.01)

(52) U.S. Cl.
CPC .......... *H04B 17/318* (2015.01); *H04W 4/027* (2013.01); *H04W 4/70* (2018.02); *H04W 24/10* (2013.01)

(58) Field of Classification Search
CPC ..... H04W 4/027; H04W 24/10; H04W 36/32; H04W 84/12
See application file for complete search history.

(56) References Cited

U.S. PATENT DOCUMENTS

| | | | |
|---|---|---|---|
| 10,045,346 B1* | 8/2018 | Marupaduga | H04L 43/16 |
| 2008/0200143 A1* | 8/2008 | Qiu | H04W 4/029 |
| | | | 455/404.2 |
| 2009/0295562 A1 | 12/2009 | Shuster | |
| 2010/0210301 A1* | 8/2010 | Dietz | H04W 52/0254 |
| | | | 455/556.1 |
| 2012/0164953 A1 | 6/2012 | Gu | |
| 2013/0059610 A1* | 3/2013 | Siomina | H04W 24/10 |
| | | | 455/456.6 |
| 2013/0122927 A1 | 5/2013 | Hu | |
| 2013/0279346 A1* | 10/2013 | Zhang | H04W 24/08 |
| | | | 370/241.1 |
| 2014/0278044 A1 | 9/2014 | Jacobs et al. | |
| 2014/0287770 A1* | 9/2014 | Liu | H04W 64/00 |
| | | | 455/450 |
| 2015/0089044 A1* | 3/2015 | Atreya | H04W 64/00 |
| | | | 709/224 |
| 2015/0296343 A1 | 10/2015 | Weiss et al. | |
| 2016/0105766 A1 | 4/2016 | de la Broise | |
| 2017/0332192 A1* | 11/2017 | Edge | H04W 4/029 |
| 2018/0252533 A1* | 9/2018 | Jantunen | G01S 3/046 |

FOREIGN PATENT DOCUMENTS

| | | |
|---|---|---|
| KR | 100862186 B1 | 10/2008 |
| WO | 2009052526 A1 | 4/2009 |
| WO | 2012070897 A1 | 5/2012 |
| WO | 2013093785 A1 | 6/2013 |
| WO | 2015179060 A1 | 11/2015 |

OTHER PUBLICATIONS

PCT Written Opinion, dated Sep. 20, 2017, in connection with International Application No. PCT/EP2016/082630, all pages.
Alvaro Fialho et al., "Classifying and Using Motion in Organic Indoor Positioning", 2012 International Conference an Indoor Positioning and Indoor Navigation, Nov. 13-15, 2012, 10 pages.

* cited by examiner

COMMUNICATION NODE, TARGET DEVICE AND METHODS FOR ACTIVATION POSITIONING PROCEDURE IN WIRELESS COMMUNICATION NETWORK

TECHNICAL FIELD

Embodiments herein relate to a communication node, a target device and methods therein. In particular, they relate to activation of a positioning procedure for a target device in a wireless communication network.

BACKGROUND

Wireless communication networks, such as Global System for Mobile Communications (GSM) networks, Wideband Code Division Multiple Access (WCDMA) or High Speed Packet Access (HSPA) networks, 3G Long Term Evolution (LTE) networks, usually cover a geographical area which is divided into cell areas. Each cell area is served by a base station, which may also be referred as a network node, eNodeB (eNB), an access node etc. A wireless communication network may include a number of cells that can support communications for a number of wireless communication devices or user equipment (UEs).

Positioning services for UEs have attracted a lot of interest for several years. In some use cases the positioning is typically triggered by an application in the UE in order to tailor a service, such as web content, specific to the current location. In other use cases it is instead triggered by the network or an application/client attached to the network, for example when locating a device in an emergency situation. A coarse positioning method that was used in early stages is to determine what Cell-ID the UE is connected to or camping on, and deduce a coarse position estimate as the coverage area of that cell, and/or the area in which this cell provides the highest received signal level.

Other early methods were more UE based without any required involvement by the cellular network. One such method for UEs, for example smartphones, that support communications over short-range technologies such as Wireless Local Area Network (WLAN) can be based on proximity to an access point with a known position. In addition, most smartphones also include a GPS receiver that often can provide an accurate position.

In LTE Release 9, a more advanced network based positioning framework was introduced. A new network node or a positioning node, the Enhanced Serving Mobile Location Centre (E-SMLC) was introduced for management of the positioning services in the network. An LTE Positioning Protocol (LPP) for specifying position related signaling within nodes is also introduced in the network. The position estimate can be calculated in the UE, referred as UE-based, or in the network node, referred as E-SMLC-based or network NW-based, and may use information provided by the UE and/or eNB(s).

Positioning methods described above, with possible enhancements, may be included in this LTE positioning framework. In addition, a new method was introduced in LTE Release 9 that involves measurements on new Positioning Reference Signals (PRS) transmitted by eNBs. The method is based on Observed Time Difference of Arrival (OTDOA), in which the UE utilizes the PRS to measure the Reference Signal Time Difference (RSTD) between subframes transmitted from a neighbor cell and a reference cell. The UE reports the measured time difference over the LPP protocol to the E-SMLC, which then uses such measurements to calculate the UE position.

Internet of Things (IoT) is a term to describe a network of interconnected physical objects that currently is evolving. The objects that are connected to IoT contain different configurations of e.g. sensors, actuators, and computers with software, as well as some means for communicating with other objects. Since this type of communication focuses on the devices themselves, often without or with little human interaction, it is also referred to as Machine-to-Machine (M2M) or Machine-Type Communication (MTC).

Among these objects, the wireless sensors are believed to be the most common one in the future IoT. These sensors are designed to perform some kind of measurement of some physical entity such as temperature, humidity, flow, level, etc. There is a large span in complexity among the different types of wireless sensors. The simplest ones consist basically only of a physical sensor and a low complexity communications unit transmitting the sensed value at predefined points in time. Slightly more advanced sensors also have an interface by which the sensor can be configured. This can be a manual interface, but in the context of wireless sensors, it is natural to consider a wireless interface over which the sensor can be controlled, e.g. to be used for network triggered measurements or setup. More advanced sensors may include more advanced control logic that for example can be used to configure the sensor operation autonomously, or at least partly autonomously.

Typically, the data reported by such a wireless sensor is relevant for a given location, e.g., the measured temperature is relevant only in combination with the location at which the temperature is measured. The positions may be entered into a database together with some sort of device identifier upon deployment of the sensors, e.g., by using an external GPS device to position the sensor and that enters the data automatically or manually into a database relating the device identifier to the location of the device. As such, the device may transmit the data along with the device identifier to enable that the measured data is related to a geographic location of the sensor. This enables e.g., big data analysis on the collection of data received from a massive number of wireless sensors.

Prior art NW-based positioning methods are typically controlled by the network or positioning node, and hence the network takes the decision to transmit position pilots etc. and order the device/UE/sensor to do measurements. In some scenarios the positioning is made on a regular basis, every x seconds/minutes etc. In other scenarios the positioning is irregular, based on some trigger, typically an external event in e.g. an emergency situation, but still mostly controlled by the network node.

IoT sensors are typically deployed for long life time without battery replacement. This means that the sensor needs to save as much power as possible and hence not transmit and receive unnecessarily. Furthermore, many of the deployed IoT sensors are rather stationary and positioning may not be needed too often. Hence applying prior art positioning methods for IoT sensors may drain the battery and reduce the life length of the IoT sensors.

The manual entering of device information and positions into a database is a time consuming task if a huge number of wireless devices are to be deployed. Also with the option of more automated GPS functionalities the positioning and mapping of device identifier to location will take a significant amount of time for many wireless sensors. In addition, this approach will not be useful if the sensors change location either intentionally or unintentionally.

SUMMARY

It is therefore an object of embodiments herein to provide an improved method and apparatus for activation of a positioning procedure for a target device, e.g. low power devices, IoT sensors and similar in a wireless communication network.

According to a first aspect of embodiments herein, the object is achieved by a method performed in a first communication node for activation of a positioning procedure for a target device in a wireless communication network. The first communication node determines whether the target device has moved, and activates a positioning procedure for the target device when the movement is larger than a threshold.

According to a second aspect of embodiments herein, the object is achieved by a method performed in a target device for performing a positioning task. The target device receives a signal from a first communication node indicating a detected movement of the target device. The target device activates a positioning procedure for performing a positioning task.

According to a third aspect of embodiments herein, the object is achieved by a first communication node for activation of a positioning procedure for a target device in a wireless communication network. The first communication node is configured to determine whether the target device has moved, and to activate a positioning procedure for the target device when the movement is larger than a threshold.

According to a fourth aspect of embodiments herein, the object is achieved by a target device for performing a positioning task. The target device is configured to receive a signal from a first communication node indicating a detected movement of the target device. The target device is further configured to activate a positioning procedure for performing a positioning task.

The principle of the embodiments herein is that the positioning procedure for a target device is triggered when a physical movement of the target device is detected by the first communication node. The first communication node may be any one of a relay node, a user equipment, a wireless modem, a machine type communications device, an access point, a network node or an eNodeB/eNB/gNB/gNodeB. Responsive to the trigger, relevant positioning signals may be transmitted and positioning tasks may be performed. The target device position may be determined by, e.g., the first communication node or a positioning node such as an E-SMLC, or be measured by a positioning unit comprised in the target device.

The activation of a positioning procedure herein may imply that a new positioning procedure is initiated, typically associated with an identifier such as a transaction identifier. The activation may alternatively imply sending of a positioning procedure message as part of an already established positioning procedure, hence typically associated with an identifier that has been used in other messages as part of the positioning procedure. In the former case, a new transaction is initiated with the positioning node, while in the latter case, positioning information may be provided to the positioning node as part of an already established transaction.

The apparatus and methods therein according to the embodiments herein allow for power efficient positioning measuring and reporting of low power sensors and devices. By allowing for the target device, e.g. the sensor, to report or otherwise being active in determining its position only when a movement of the sensor has been detected, the communication needed for accurate positioning may be held on a "only when needed" basis and hence no unnecessary positioning communication is made. In this way the battery length or life length of the sensor is increased.

The embodiments herein provide a fast and reliable mechanism for triggering of on-demand positioning signal transmission, measurements and reporting. The embodiments herein may be applied to many different kinds of wireless communication devices or IoT objects. Since many wireless communication devices in the wireless communication network are typically static, and the measurement signals load associated with those that are moving may be limited to a level that is appropriate for their degree of mobility. This will also generate less interference in the wireless communication network.

Therefore, the embodiments herein provide an improved method and apparatus for activation of a positioning procedure for low power devices and achieve the benefits of a lean on-demand measuring and reporting principle.

BRIEF DESCRIPTION OF THE DRAWINGS

Examples of embodiments herein are described in more detail with reference to attached drawings in which.

DETAILED DESCRIPTION

Figure 1:
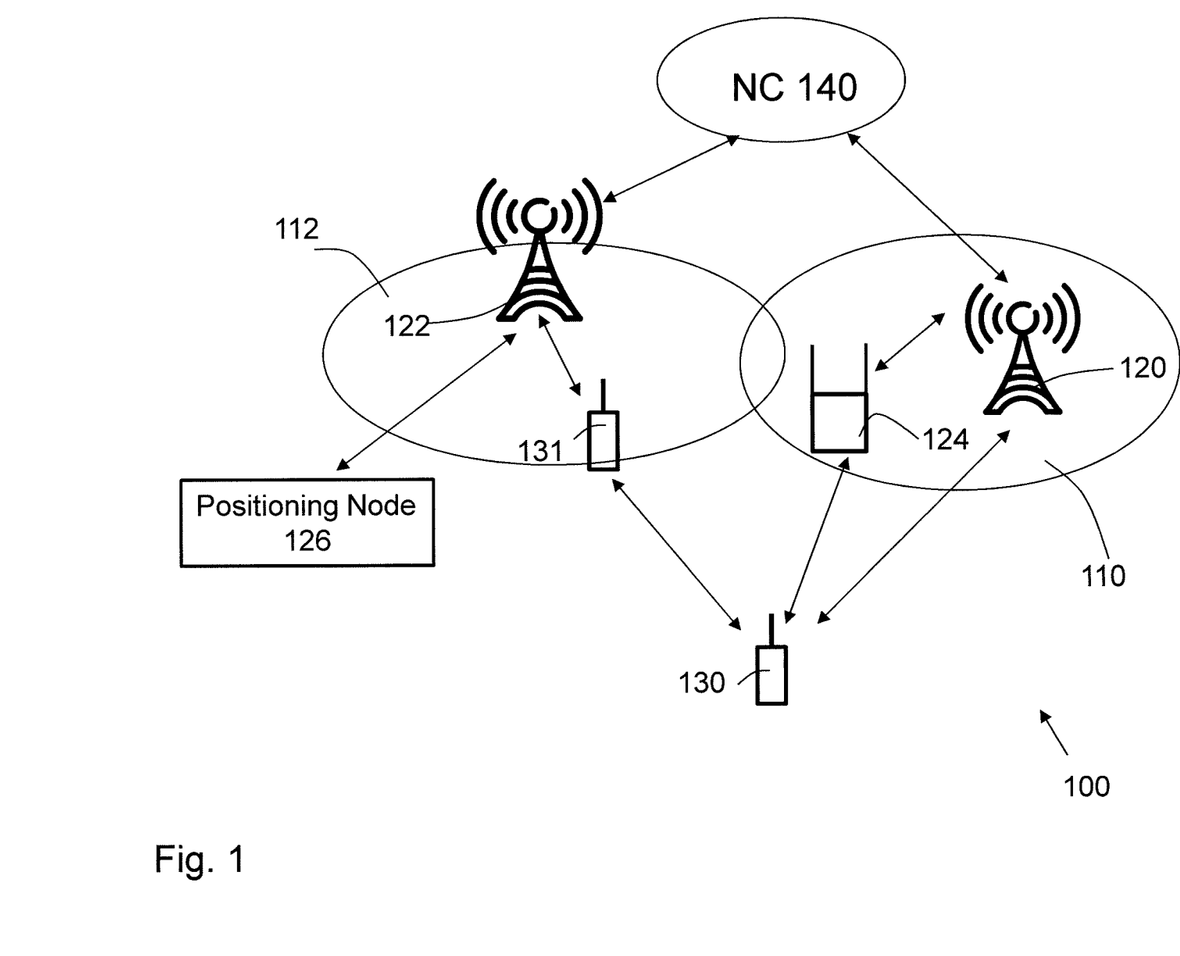
FIG. 1 is a schematic block diagram illustrating embodiments of a wireless communication network.

FIG. 1 depicts an example of a wireless communication network 100 in which embodiments herein may be implemented. The wireless communication network 100 may be any wireless system or cellular network, such as a Long Term Evolution (LTE) network, any 3rd Generation Partnership Project (3GPP) cellular network, Worldwide interoperability for Microwave Access (WIMAX) network, Wireless Local Area Network (WLAN/WI-FI network), a Fourth Generation (4G) or LTE advanced network, a Fifth Generation (5G) or New Radio (NR) network etc.

The wireless communication network 100 comprises a plurality of cells whereof two, a first cell 110 comprising a first Access Node (AN) 120 and a second cell 112 comprising a second Access Node 122, are depicted in FIG. 1. The first Access Node 120 serves the first cell 110, while the second Access Node 122 serves the second cell 112. The first Access Node 120, the second Access Node 122 are network access nodes which each may be, for example, an eNB, gNB an eNodeB, gNodeB, or an Home NodeB, or an Home eNodeB or an Home gNodeB. The wireless communication network 100 may further comprise other network nodes capable to serve a wireless communication device, such as a user equipment or a machine type communication device in a wireless communication network, whereof a relay 124 and a server node, e.g. a positioning node 126, are depicted in FIG. 1. The positioning node 126 may determine and possibly maintain position information for the wireless communication devices. The positioning node 126 may be a separate node or may be comprised in any other node, e.g.

network node 120/122, E-SMLC, Mobility Management Entity (MME), Secure Location Platform (SLP) or Secure User Plane Location Platform (SUPL).

The wireless communication network may further comprise a Network Controller 140 which communicates with the first and second access nodes 120, 122, and acts as a handling unit or a controller for different Radio Access Technologies. The network controller may be a separate node as depicted in the figure, or its corresponding functionalities may be incorporated within another network node such as e.g. the access nodes 120, 122.

A plurality wireless communication devices operates in the wireless communication network 100, whereof two wireless communication devices 130, 131 are depicted. The wireless communication devices 130, 131 may be any type of IoT device, such as a user equipment, a mobile wireless terminal or a wireless terminal, a mobile phone, a sensor or actuator with wireless capabilities or any other radio network units capable to communicate over a radio link in a wireless communication network. As shown in FIG. 1, the wireless communication devices 130, 131 may communicate directly with the first, second Access Nodes 120, 122 or through the relay node 124. The wireless communication device 130 is referred hereafter as a target device 130 whose position needs to be reported. So the target device 130 may represent any IoT objects, such as sensors, sensor units or similar devices. A sensor unit may be a unit with at least one sensor or/and actuator and a wireless communication unit capable for wireless cellular or local communication with remote network nodes, access points, or UE relays. The term "relay" shall be interpreted in a very broad sense herein, referring to any type of intermediate node operating between the access nodes 120, 122 and the target device 130. In some embodiments, this intermediate node comprises a UE, taking the role as a relay 124. This may for example be achieved by having the UE 131 appear to the target device 130 as a pure extension of the Access Node 120/122, such that the relay 131 is more or less transparent to the target device 130. Alternatively, the UE 131 may establish a local communication link with the target device 130, operating as a wireless gateway, such that the target device 130 does not necessarily to have any awareness of how the UE 131 accesses the rest of the network, including the access node 120/122. In other embodiments, the relay 124 comprises a more dedicated relay node, such as the Relay Node (RN) defined for 3GPP LTE Rel-10, or suitable extensions of this. Other types of nodes can also be envisioned within the scope of this invention, as long as they function as an intermediate node operating between the access node 120, 122 and the target device 130. The terms "relay", "relay node" and "UE relay" are used interchangeably herein. The use is of one term may suggest a certain type of node for describing the functionality, but shall not preclude any other type of nodes being used in its place.

According to the embodiments herein, a positioning procedure is activated for a target device 130 by a determined movement of the target device. The determination of whether the target device has moved may be made by any one of a relay node, a UE, a wireless modem, a MTC device, an access point, a network node or an eNodeB/gNodeB. However, the common principle of positioning procedure activation for the target device 130 is based on the physical movement of the target device 130. Therefore a general term a first communication node is used hereafter to represent a relay node 124, a UE 131, a wireless modem, an MTC device, an access point, a network node 120, 122 or an eNodeB/gNodeB.

Figure 2:
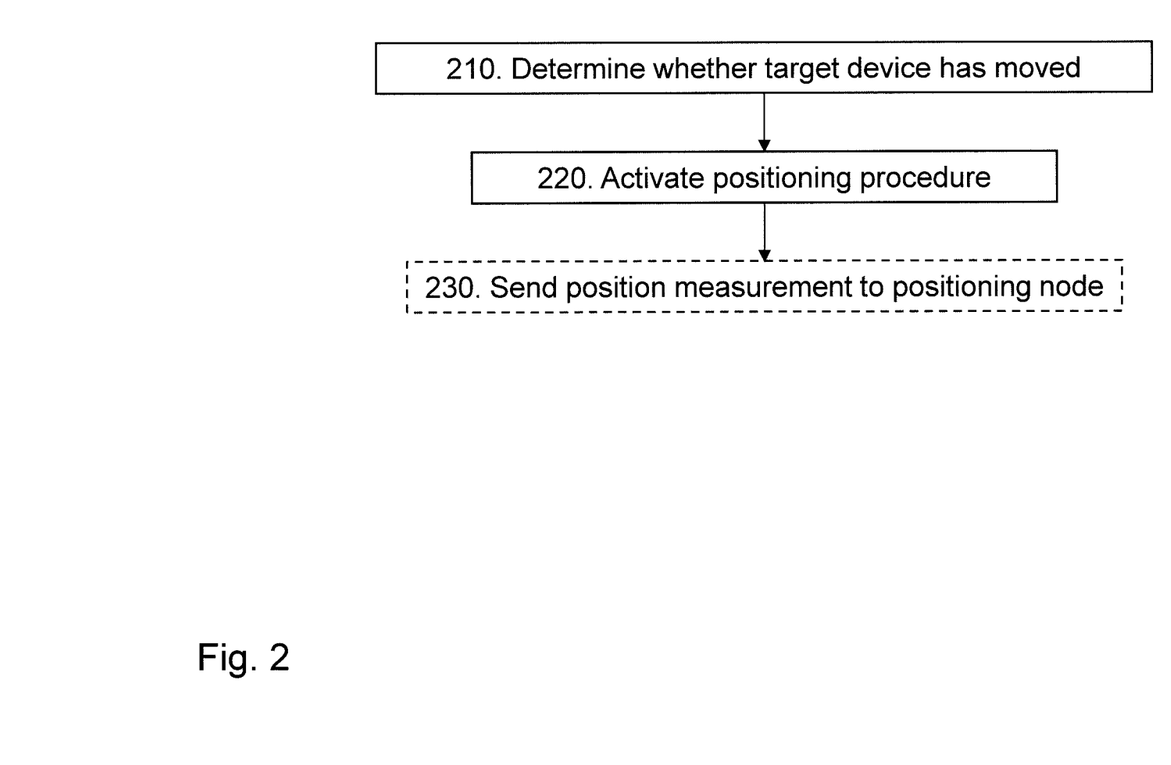
FIG. 2 is a flowchart depicting one embodiment of a method in a first communication node.

Example of embodiments of a method performed in a first communication node 120, 122, 124, 131 in the wireless communication network 100 for activation of a positioning procedure for the target device 130 will now be described with reference to FIG. 2. As described above, the wireless communication network 100 comprises a plurality of access nodes 120, 122, where the access node 120 is the serving access node which communicates with the target device 130 directly or via a UE relay 124 through a serving link. Though the access node 122 is depicted as a single node, it may represent any number of access nodes in the communication network, acting as non-serving access nodes/cells for the target device 130 and/or the UE relay 124. In this respect, any non-serving access node may use the same carrier frequency as the serving access node 120, or different carrier frequencies.

The serving link may be referred to as any cell, beam, sector, node etc., which servers the target device 130 via a communication link.

In a typical communication network scenario, a direct communication link between the access node 120 and the UE relay 124 or the target device 130 comprises downlink and uplink communication using a cellular radio-access technology, RAT, such as GSM, 3G WCDMA, 3G/4G LTE, or 5G NR. The direct communication link between the UE relay 124 and the target device 130 may in some embodiments comprise the same or a different cellular RAT. The communication may in these embodiments be conducted using the downlink and uplink protocols for the RAT, or using a device-to-device, D2D, protocol, such as the Sidelink functionality introduced for LTE Release 12. In other embodiments the direct communication link between the UE relay 124 and the target device 130 may comprise a short-range radio access technology such as WLAN or BLUETOOTH technology. The different communication links may operate on the same carrier frequency, or on different carrier frequencies in the same or in different frequency bands. The different communication links may further comprise RATs specifically targeting Machine-to Machine (M2M) applications such as, e.g., Narrow Band IoT (NB-IoT), enhanced Machine Type Communications (eMTC) or Extended Coverage-GSM-IoT (EC-GSM-IoT) developed within 3GPP, or LORA technology, SIGFOX technology or similar technologies. LORA technology is a spread-spectrum technology with a wider band, usually 125 kHz or more, while SIGFOX technology is a narrowband or ultra-narrowband technology that mobile network operators adopt for IoT deployments over both city and nationwide low power, wide-area networks (LPWANs). The listed usage of RATs above shall be seen as non-limiting examples only and they can be varied and combined without any particular restriction.

So according to embodiments herein the communication link between the first communication node 120, 122, 124, 131 and the target device 130 may be any one of the Radio Access Technologies (RATs) such as GSM, 3G WCDMA, 3G/4G LTE, 5G NR, WLAN or any other short-range device-to-device D2D, BLUETOOTH, Side-link, NB-IoT, EC-GSM-IoT, or LORA, and SIGFOX etc. technologies.

The method performed in a first communication node 120, 122, 124, 131 comprises the following actions:

Action 210

The first communication node 120, 122, 124, 131 determines whether the target device 130 has moved.

It is assumed that the target device 130 is connected or camping or registered to the first communication node 120, 122, 124,131. It may in some embodiments transmit sensor data or other data information which is not position based on regular intervals or on event basis. The target device 130 may perform a first position measurement, for example by an order from the network, based on transmitted position pilots, or other known transmitted symbols. The positioning method may be performed according to a measurement procedure defined by the standard and a measurement report is sent to the first communication node 120, 122, 124, 126, 131 with position information, for example based on Observed Time Difference Of Arrival (OTDOA), direction of arrival information, triangulation, etc.

The target device 130 may then turn off its wireless radio communication unit (WRU), e.g. may enter into sleep mode or some other low-power mode, in order to save power. In some optional embodiments the WRU may wake up and perform measurements or paging reception at configured time instants.

There are different kinds of methods to detect or determine whether the target device 130 has moved compared to the first reported position. For example, an accelerometer sensor, a Global Navigation Satellite System (GNSS) sensor, or GPS etc. in the target device 130 may be used for detection of its movement.

According to the embodiments herein, the detection of motion or movement of the target device 130 is based on detection by the remote nodes, i.e. the first communication node 120, 122, 124, 131. For example, determining that the target device 130 is moving may be made by monitoring Radio Resource Management (RRM) measurements, e.g. Reference Signal Received Power (RSRP), Reference Signal Received Quality (RSRQ), Received Signal Strength Indication (RSSI), Channel Quality Information (CQI), Channel State Information (CSI), Angel of Arrive (AOA), beam or cell re-selection requests etc. which may indicate a movement of the target device 130.

Therefore, according to some embodiments herein, the first communication node 120, 122, 124, 131 may receive a signal from the target device 130 and determine whether the target device 130 has moved based on characteristics of the received signal.

The characteristics of the received signal may be at least one of or a combination of a measured signal strength, a measured signal quality, a measured angle of arrival etc. These characteristics are related to the measurements performed by the first communication node 120, 122, 124, i.e. uplink based measurements. For example, the uplink channel estimates in the first communication node 120, 122, 124 baseband may be used to determine a Doppler spread and associated vehicular speed of the target device 130.

The characteristics of the received signal may alternatively or additionally be at least one of or a combination of a reported signal strength, a reported signal quality, a reported angle of arrival, a reported channel state information, a reported event related to handover etc. These characteristics are related to the contents of the signals sent from the target device 130 to the first communication node 120, 122, 124, and they may for example comprise reports of downlink based measurements or a handover event.

Therefore, according to some embodiments, determining whether the target device 130 has moved may be based on comparing the characteristics of the received signal with the characteristics of previously received signals from the target device 130.

For example, the determination whether the target device 130 has moved may be based on signal strength measurement reports with regard to one or more network access nodes received from the target device 130. The movement may be determined e.g. by comparing subsequent signal strength measurement reports and detecting changes in absolute or relative signal strengths of the one or more network access nodes.

The determination whether the target device 130 has moved may be based on timing advance estimates of the target device 130 with regard to one or more network access nodes. The movement may be determined e.g. by comparing subsequent timing advance estimates and detecting changes in absolute timing advance values or timing advance differences for the one or more network access nodes. That is, the first communication node 120, 122, 124 may use available signal strength quality measurement reports of the target device 130 with regard to one or more access nodes or timing advance (TA) estimates to determine whether the target device is static or moving, and how rapidly. If changes in those values are detected that exceed a threshold, the device is categorized as moving, and the rate of change of these values is used to estimate the movement speed, or the mobility extent.

The determination of whether the target device 130 has moved may also be based on a combination of the above listed measured and reported signal characteristics.

When the target device 130 is linked with a relay node or another UE, e.g. the UE relay 124 or UE 131, or a wireless modem, a machine type communications, MTC, device, a reported event related handover between cells or beams for either the UE relay 124, UE 131 or the target device 130 indicates a movement of the target device 130. For example, if both the UE relay 124 and the target device 130 are physically located on a truck or a moving carrier, a detected movement of the UE relay 124 or a reported event related to handover for the UE relay 124 will indicate a movement of the target device 130 although the relative position between the UE relay 124 and the target device 130 has not changed. Therefore, determining whether the target device 130 has moved may also be based on a detected movement of the first communication node 124, 131 or a handover between cells or beams for at least one of the first communication node 124, 131 and the target device 130.

Determining whether the target device 130 has moved may also be based on a relative position change between the first communication node and the target device. For example, a relay node 124, a UE 131 or other device, such as a wireless modem or a MTC device, may use knowledge of its own position and the position of the target device 130 relative to the UE 131 or the UE relay 124 in order to detect the target device 130 movement. In addition to the previously mentioned detection methods, the UE 131 or UE relay 124 may here also utilize some short-range communication technology such as e.g. near-field communication (NFC) to detect target devices in its vicinity, and based on these measurements and compare with previously known targets devices positions, to determine that a target device has moved.

For example, if the UE is close to an expected sensor position, but is not able to locate the sensor in its vicinity, it may indicate that the sensor has moved and may trigger a procedure to update the sensor position. In some of these embodiments, the ability to communicate with the sensor using the short-range technology is itself an indication of the relative position. In other embodiments other metrics such as received signal strengths and similar, including the ones listed previously, are used to determine the relative position. The data base of previously known sensor positions may be located in the UE or retrieved remotely over a wireless communication link.

In some embodiments, metrics from a set of sensors are combined in order to determine whether at least one of the sensors has moved. One example may be when a UE, e.g. the UE relay 124 in FIG. 1, is itself moving in the vicinity of the set of sensors and registers e.g. measurements of signal strength from some of the sensors to estimate a distance to each of the sensors. By comparing these distances with what would be expected based on previously known sensors positions and the UEs own position, the UE may get an indication of whether a group of sensors within the set has moved.

Action 220

When the determined movement of the target device 130 is larger than a threshold, the first communication node 120, 122, 124,131 activates a positioning procedure for the target device 130. For example, when a sensor movement has been detected, it is possible, and often desired, to associate a threshold with the movement. That is if the movement is larger than the threshold, a new positioning procedure is initiated, otherwise it is not.

Figure 2A:
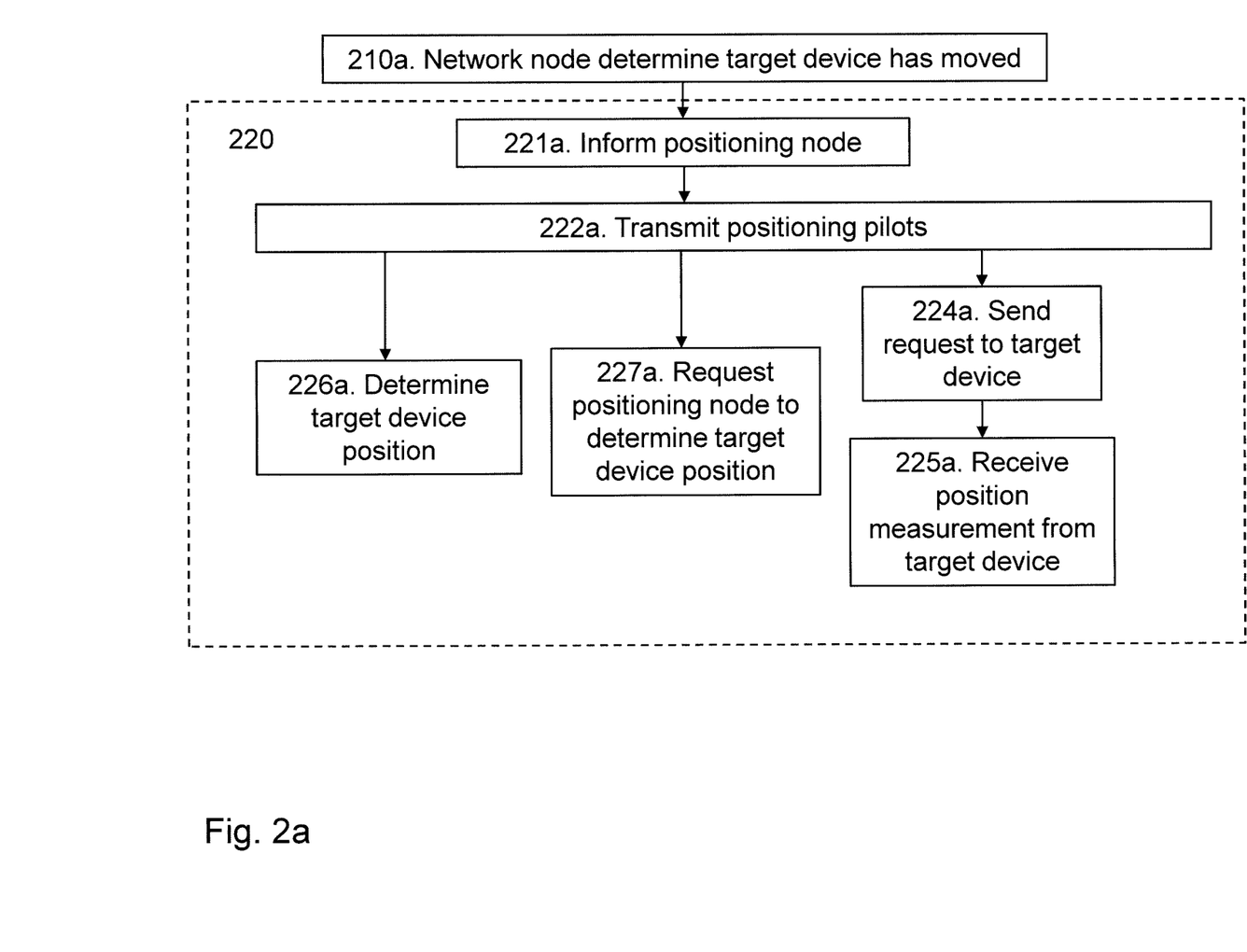
FIGS. 2a and 2b are flowcharts depicting embodiments of positioning procedures in the first communication node.
Figure 2B:
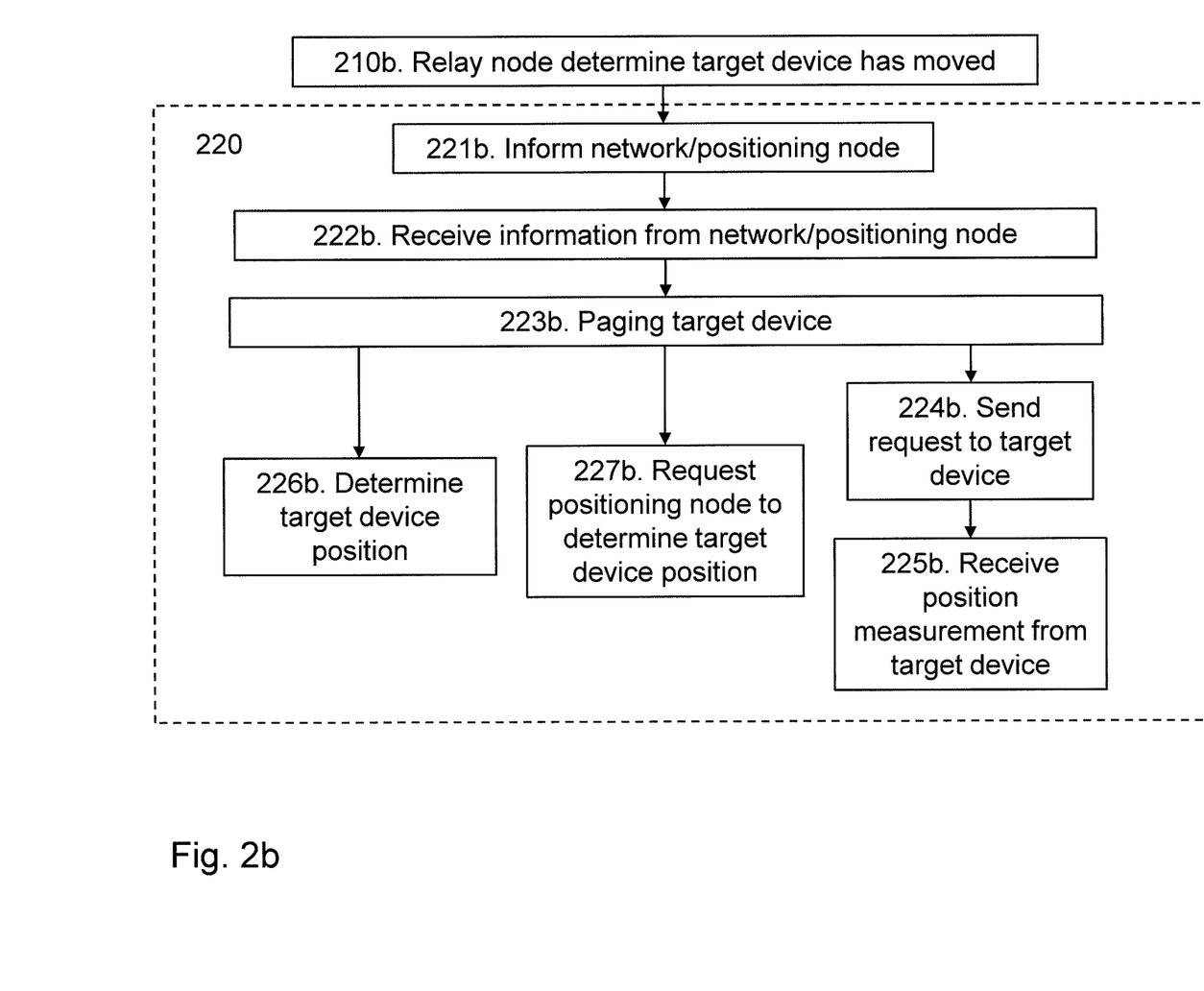

Depending on which node that determines whether the target device 130 has moved, different positioning procedures may be activated and different actions may be performed, as will be further described in relation to FIGS. 2a and 2b.

Moreover, the action 220 also depends on whether there is an existing established positioning procedure or not. If there is no existing positioning procedure, then a new procedure needs to be initiated with the positioning node 126 and the procedure is typically assigned a transaction identifier. If instead, there is an existing positioning procedure, the actions will be related to the existing procedure, typically via the transaction identifier, and activation implies that messages within the existing procedure are triggered.

Action 230

Once a motion of the target device 130 has been detected or determined, the positioning server node 126 is informed by the node detecting the target device movement and performs a network node or cellular communication based position estimate update for the target device 130. So the first communication node 120, 122, 124 may send the position measurement to the positioning node 126. This action is optional and only be performed when the position measurement is performed by other nodes than the positioning node 126.

In the case when there is an existing positioning procedure established, then the positioning measurements themselves can be seen as an activation of the positioning procedure.

In the following, different actions related to different positioning procedures will be described in detail with reference to FIGS. 2a and 2b. In order to describe clearly the different actions related to the different positioning procedures, Action 210 may be divided by two actions in the following scenarios:

First scenario, Action 210a: The network node 120, 122 determines that the target device 130 has moved.

Second scenario, Action 210b: The UE 131 or UE relay 124 or other device, such as a wireless modem or a MTC device determines that the target device 130 has moved.

For the first scenario, corresponding to FIG. 2a, the network node 120, 122 determines that the target device 130 has moved, Action 220 may comprise one or more of the following actions performed by the network node 120, 122:

Action 221a: The network node 120, 122 may inform the positioning node 126 about the detected movement of the target device 130.

In some embodiments, this information comprises an order to the positioning node 126 for a new position measurement in the positioning node 126. That is, the network node 120, 122 may inform the positioning node 126 that a position measurement for the target device 130 is needed. In some other embodiments, the information comprises positioning information to support the positioning as part of an existing positioning procedure.

Action 222a: The network node 120, 122 may receive information from the positioning server node 126 to transmit positioning pilots. In some embodiments, the actual decision to start new position measurements is taken in the positioning server node 126. The positioning node 126 then may in some embodiments in turn instruct one, two, or more of the network nodes 120, 122 to start transmit position pilots at given time and frequency resources. The position pilots may in some embodiments be transmitted using the same beam pattern as one that was recently used in communication with the target device 130, or a beam pattern that is based on this one, for example using a slightly wider beam. The position node 126 may also order the network node 120, 122 to page the target device 130 for positioning measurements at a forth coming paging instant. The positioning node 126 may also order the network node 120, 122 to monitor signals transmitted from the target device.

The position measurement may be performed either by the network node 120, 122, the positioning node 126 or by the target device 130, which will be described in detail in the following.

According to some embodiments herein, the target device 130 may perform the position measurement, then the following actions may be performed:

Action 224a: The network node 120, 122 may transmit a request to the target device 130 to perform a positioning task. Therefore, according to some embodiments herein, the first communication node 120, 122, 124, 126 may activate a positioning procedure for the target device 130 by sending a request to the target device 130 to perform a positioning task. The positioning task may be that the target device 130 measure its position by a positioning unit comprised in the target device 130. The positioning unit may be a GPS device or any other positioning device.

According to some embodiments herein, the positioning task may be that the target device 130 performs measurements on positioning pilots transmitted from one or more network nodes, e.g. the first and second network nodes 120, 122.

Action 225a: When the positioning task is performed by the target device 130, the first communication node 120, 122, 124, 126 may receive the position measurement from the target device 130.

According to some embodiments herein, the network node may perform the position measurement, so the following action may be performed:

Action 226a: The network node 120, 122 may determine the target device 130 position. This may be done by calculating the target device 130 position based on measurements of positioning pilots. Alternatively, the network node(s) 120, 122 may determine the target device 130 position by performing measurements on some signal transmitted from the target device 130. As non-limiting examples, this may comprise combined angle-of-arrival and/or signal strength measurements, or Uplink-Time Difference of Arrival, U-TDOA, measurements combined from several network nodes 120,122. In the case, when the network node 120,122 sends an order to the wireless communication device 130 to transmit some uplink measurement signal, the uplink measurement signal configuration may be conveyed in the order, or via an earlier configuration. The target device 130 transmits the uplink measurement signal according to the order, and the network node 120, 122 performs measurements on the uplink measurement signal. Therefore, according to some embodiments herein, the first communication node 120, 122 activates a positioning procedure for the target device 130 by determining the target device 130 position in the first communication node.

According to some embodiments herein, the positioning node 126 may perform the position measurement, so the following action may be performed:

Action 227a: The network node 120, 122 may request the positioning node 126 to determine the target device position. This is for example done by forwarding reports of measurements on positioning pilots made by the target device 130.

For a second scenario, corresponding to FIG. 2b, the UE relay 124 determines that the target device 130 has moved, Action 220 may comprise one or more of the following actions performed by the UE relay 124:

Action 221b: The UE relay 124 reports the event on detected movement to the network node 120, 122 or/and positioning node 126. The network node 120, 122 or/and positioning node 126 in turn transmit paging information and possible position pilot configuration to the UE relay.

Action 222b: The UE relay 126 receive information on position pilot transmission from the network node(s) 120, 122 or/and positioning node 126.

Action 223b: The UE relay 126 then pages target device 130, e.g. at a forth coming paging instant.

Alternative embodiments on position measurement performed either by the network node 120, 122, the positioning node 126 or by the target device 130 as described above for the first scenario may be applied also for the second scenario with necessary modifications. For example, the following actions may be performed:

Action 224b: The UE relay 126 may transmit a request to the target device 130 to perform a positioning task.

Action 225b: When the positioning task is performed by the target device 130, the UE relay 124 may receive the position measurement from the target device 130.

Action 226b: The UE relay 126 may determine the target device 130 position. This may be done by calculating the target device 130 position based on measurements of positioning pilots or based on a proximity of the UE relay 126 to the target device 130.

Action 227b: The UE relay 126 may request the positioning server node 126 to determine the target device position.

For all above described scenarios, the positioning procedure for the target device 130 may be triggered or requested once the detected or determined movement has been ended. Optionally the target device 130 may hold off, or stop or paus reporting sensor data while motion is detected, until the motion has stopped.

Figure 3:
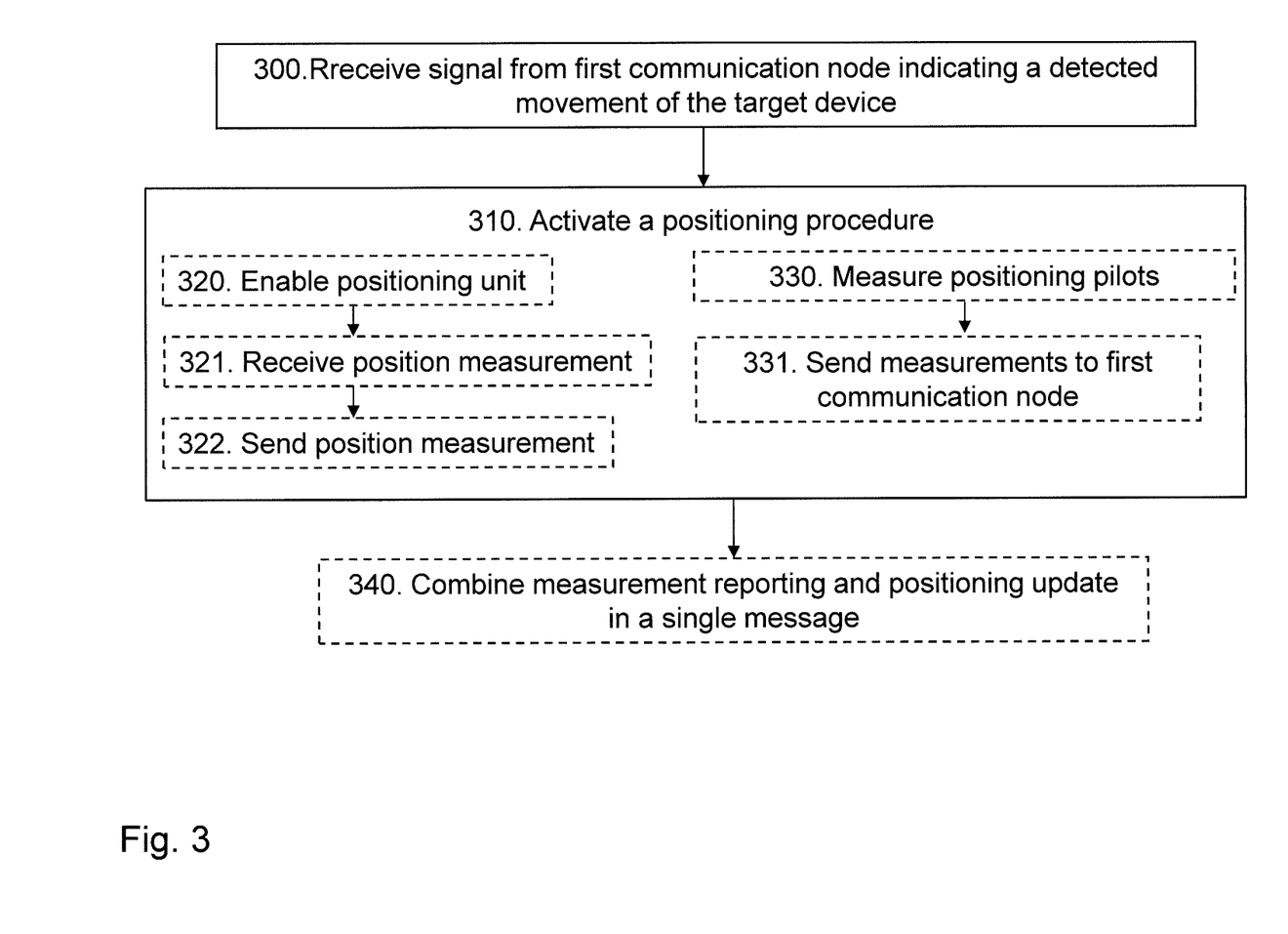
FIG. 3 is a flowchart depicting one embodiment of a method in a target device.

Example of embodiments of a method performed in the target device 130 for performing a positioning task in the wireless communication network 100 will now be described with reference to FIG. 3. The method comprises the following actions:

Action 300

The target device 130 receives a signal from a first communication node 120, 122, 124, 126, 131 indicating a detected movement of the target device 130.

Action 310

The target device 130 activates a positioning procedure for performing a positioning task.

There are different alternatives to activate a positioning procedure.

According to some embodiments, the Action 310 may comprise the following actions:

Action 320

The target device 130 may enable a positioning unit comprised in the target device 130 to perform a position measurement. This may be done by measuring positioning pilots transmitted from a network node. The positioning unit may be a GPS device or any other positioning device.

Action 321

The target device 130 may then receive the position measurement from the positioning unit.

Action 322

The target device 130 may send the position measurement received from the positioning unit to the first communication node 120, 122, 124, 131 or the positioning unit may send the position measurement directly to the first communication node 120, 122, 124, 131 or to the positioning node 126 via one or more other nodes.

According to some embodiments, the position of the target device 130 may be determined by the first communication node 120, 122, 124, 131 or the positioning node 126, so Action 310 may comprise the following actions:

Action 330

The target device 130 measures the positioning pilots.

Action 331

The target device 130 then sends the measurements on the positioning pilots to the first communication node for determining the target device position.

As described above, the target device 130 may hold off, or stop or paus reporting sensor data while motion is detected, until the motion has stopped. In some embodiments, the target device 130 piggybacks measurement reports and position updates to further reduce the battery consumption. So the target device 130 may perform the following action:

Action 340

The target device 130 may combine the measurement reporting and the positioning update in a single message.

Figure 4:
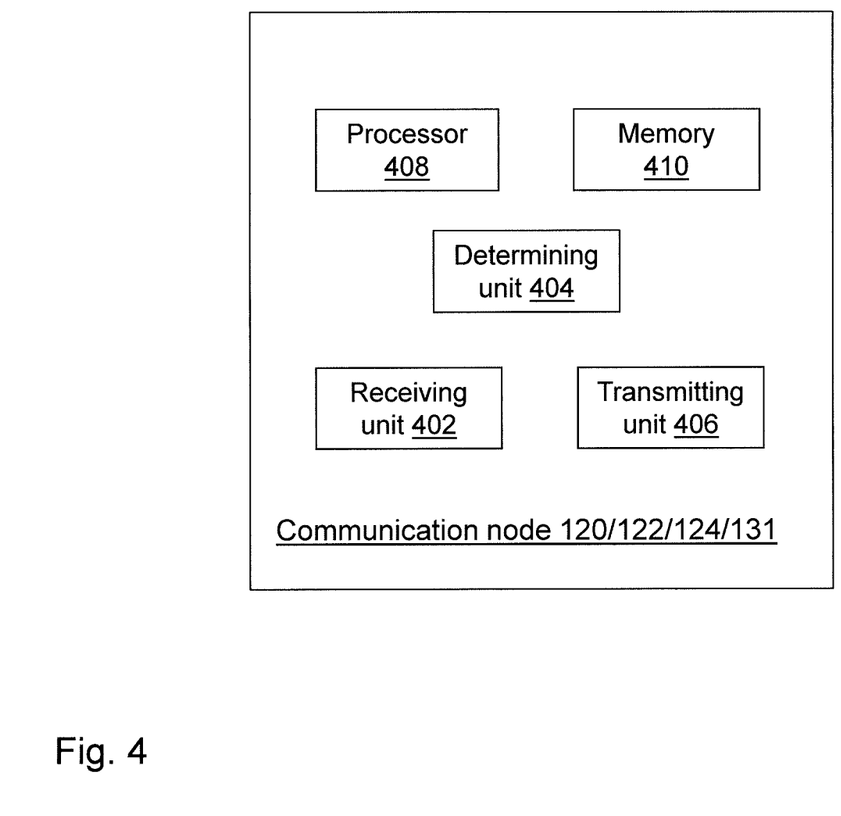
FIG. 4 is a schematic block diagram illustrating embodiments of a first communication node.

To perform the method actions in the first communication node 120, 122, 124, 131 for activation of a positioning procedure for a target device 130 in the wireless communication network 100 described above in relation to FIGS. 2, 2a, 2b, the first communication node 120, 122, 124, 131 comprises circuits or units as depicted in FIG. 4. The first communication node 120, 122, 124, 131 comprises e.g. a receiving unit 402, a determining unit 404, a transmitting unit 406, a processor 408 and a memory 410.

According to the embodiments herein, the first communication node 120, 122, 124, 131 is configured to, e.g. by means of the determining unit 404 being configured to, determine whether the target device 130 has moved.

There are several ways to determine whether the target device 130 has moved:

According to one embodiment, the first communication node 120, 122, 124, 131 may be configured to, e.g. by means of the receiving unit 402 being configured to, receive a signal from the target device 130, and the determining unit 404 may be further configured to determine whether the target device has moved based on characteristics of the received signal.

According to one embodiment, the first communication node may be any one of a relay node 124, a user equipment 131, a wireless modem, a MTC device, then determining whether the target device has moved my be based on any one of a detected movement of the first communication node

124, 131, a handover between cells or beams for the first communication node 124, 131, or a relative position change between the first communication node 124, 131 and the target device 130.

According to the embodiments herein, the first communication node 120, 122, 124, 131 is further configured to activate a positioning procedure for the target device 130 when the movement is larger than a threshold.

There are different ways to activate a positioning procedure:

According to one embodiment, the first communication node 120, 122, 124, 131 may be configured to, e.g. by means of the transmitting unit 406 being configured to, send a request to the target device 130 to perform a positioning task. The positioning task may comprise measuring the target device position by a positioning unit comprised in the target device, or performing measurements on positioning pilots transmitted from one or more network nodes.

According to one embodiment, the first communication node 120, 122, 124, 131 may be configured to, e.g. by means of the determining unit 404 being configured to, determine the target device position.

According to one embodiment, the first communication node 120, 122, 124, 131 may be configured to, e.g. by means of the transmitting unit 406 being configured to, send the position measurement to a positioning server node 126.

According to some embodiments, the first communication node 120, 122, 124, 131 may be a network node 120, 122 or an eNodeB or gNode B, or an access point, and the first communication node may be configured to inform a positioning node 126 that a position measurement for the target device 130 is needed and may receive information from the positioning node 126 to transmit positioning pilots.

According to some embodiments, the first communication node may be a relay node 124, and the first communication node may be configured to report detected movement to the network node 120, 122 or/and positioning node 126, receive information on position pilot transmission from the network node 120, 122 or/and positioning node (126), and page the target device 130 with the information on position pilot transmission.

According to some embodiments, the first communication node 120, 122, 124, 131 may be further configured to request the positioning node 126 to determine the target device position.

According to some of the embodiments, any of the target device 130, the first communication node 120, 122, 124, 131, the positioning node 126 may be configured to maintain an established positioning procedure, and upon activation continue using the established positioning procedure.

Figure 5:
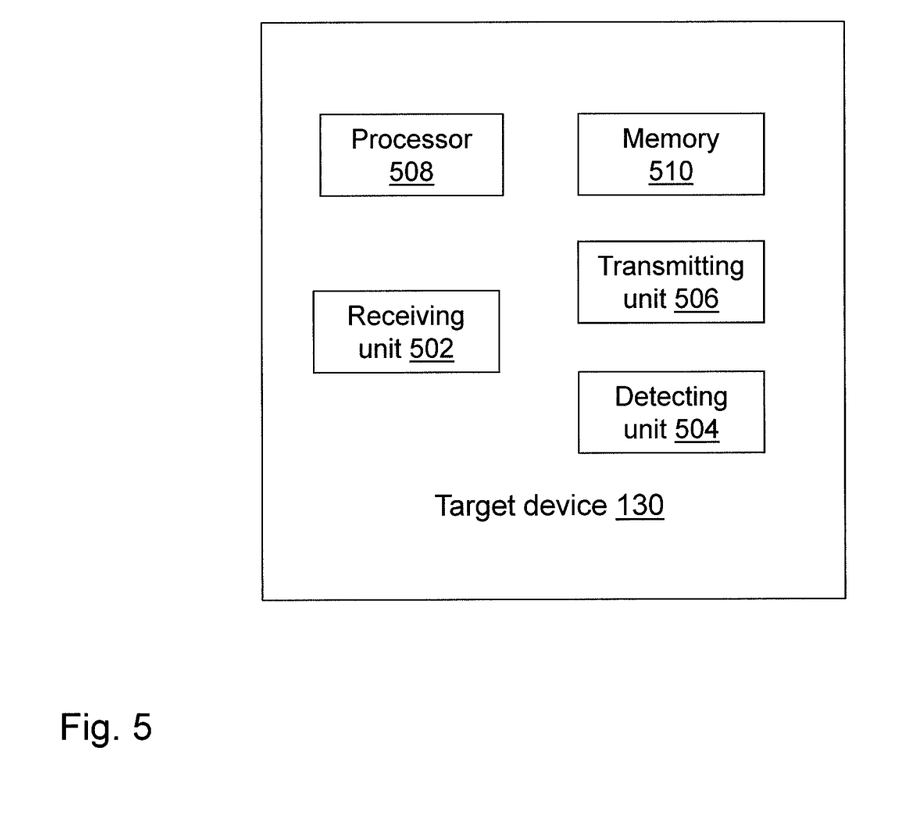
FIG. 5 is a schematic block diagram illustrating embodiments of a target wireless communication device.

To perform the method actions in the target device 130 for performing a positioning task in the wireless communication network 100 described above in relation to FIG. 3, the target device 130 comprises circuits or units depicted in FIG. 5. The target device 130 comprises a receiving unit 502, a determining unit 504, a transmitting unit 506, a processor 508, a memory 510.

The target device 130 is configured to, e.g. by means of the receiving unit 502 being configured to, receive a signal from a first communication node 120, 122, 124, 131 indicating a detected movement of the target device.

The first communication node 120, 122, 124, 131 may be any one of a relay node, a User equipment, a wireless modem, a machine type communications, MTC, device, an access point, a network node or an eNodeB or gNode B.

The target device 130 is further configured to, e.g. by means of the determining unit 504 being configured to, activate a positioning procedure for performing a positioning task.

According to some embodiments, the target device 130 may be configured to enable a positioning unit comprised in the target device 130 to perform a position measurement.

According to some embodiments, the target device 130 may be further configured to, e.g. by means of the transmitting unit 506 being configured to, send the position measurement received from the positioning unit or send the position measurement directly from the positioning unit to the first communication node 120, 122, 124, 131.

According to some embodiments, the target device 130 may be configured to measure positioning pilots transmitted from a network node.

According to some embodiments, the target device 130 may be further configured to send the measurements on the positioning pilots to the first communication node for determining the target device position.

According to some embodiments, the target device 130 may be further configured to combine data measurement reporting and positioning update in a single message.

Those skilled in the art will appreciate that the receiving unit 402, the determining unit 404 and the transmitting unit 406 described above in the first communication node 120, 122,124, 131 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC). These may also apply to the receiving unit 502, the transmitting unit 506 and the determining unit 504 described above in the target device 130.

The embodiments herein for activation of a positioning procedure for a target device 130 in the wireless communication network 100 may be implemented through one or more processors, such as the processor 408 in the first communication node 120,122,124, 131, the processor 508 in the target device 130, together with computer program code for performing the functions and actions of the embodiments herein. The program code mentioned above may also be provided as a computer program product, for instance in the form of a data carrier carrying computer program code for performing the embodiments herein when being loaded into the first communication node 120,122,124, 131, and/or into the target device 130. One such carrier may be in the form of a CD ROM disc. It is however feasible with other data carriers such as a memory stick. The computer program code may furthermore be provided as pure program code on a server and downloaded to the first communication node 120,122,124, 131 and target device 130.

The memory 410 in the first communication node 120, 122,124, 131 and the memory 510 in the target device 130 may comprise one or more memory units and may be arranged to be used to store received information, measurements, data, configurations and applications to perform the methods herein when being executed in the first communication node 120,122,124, 131 and the target device 130.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a first communication node for activation of a positioning procedure for a target device in a wireless communication network comprising:
   determining whether the target device has moved and an amount of the movement; and
   activating a positioning procedure for the target device when the amount of the movement is larger than a threshold,
   wherein the first communication node is a network node, and wherein activating a positioning procedure for the target device comprises:
   informing a positioning node that a position measurement for the target device is needed,
   and wherein the method further comprises:
      receiving information from the positioning node to transmit positioning pilots.

2. The method according to claim 1, wherein determining whether the target device has moved comprising:
   receiving a signal from the target device; and
   determining whether the target device has moved based on characteristics of the received signal.

3. The method according to claim 2, wherein the characteristics of the received signal comprises at least one of or a combination of a measured signal strength, a measured signal quality, a measured angle of arrival, a reported signal strength, a reported signal quality, a reported angle of arrival, a reported channel state information, a reported event related to handover.

4. The method according to claim 2, wherein determining whether the target device has moved based on characteristics of the received signal comprising comparing the characteristics of the received signal with the characteristics of previously received signals from the target device.

5. The method according to claim 1, wherein determining whether the target device has moved is based on a handover between cells or beams for the target device.

6. The method according to claim 1, wherein the first communication node is any one of a relay node, a User Equipment, a wireless modem, a machine type communications (MTC) device, an access point, a network node, or an eNodeB or gNode B.

7. The method according to claim 1, wherein the first communication node is any one of a relay node, a User Equipment, a wireless modem, and a machine type communications (MTC) device, and wherein determining whether the target device has moved is based on any one of:
   a detected movement of the first communication node;
   a handover between cells or beams for the first communication node; or
   a relative position change between the first communication node and the target device.

8. The method according to claim 1, wherein activating a positioning procedure for the target device comprises:
   reporting positioning information to a positioning node as part of an existing positioning procedure.

9. The method according to claim 1, wherein activating a positioning procedure for the target device comprises:
   sending a request from the first communication node to the target device to perform a positioning task.

10. The method according to claim 9, wherein the positioning task comprises measuring the target device position by a positioning unit comprised in the target device.

11. The method according to claim 9, wherein the positioning task comprises performing measurements on positioning pilots transmitted from one or more network nodes.

12. The method according to claim 10, further comprising receiving the position measurement from the target device.

13. The method according to claim 1, wherein activating a positioning procedure for the target device comprises determining the target device position in the first communication node.

14. The method according to claim 13, wherein determining the target device position in the first communication node comprises calculating the target device position based on measurements of positioning pilots or based on a proximity of the first communication node to the target device.

15. The method according to claim 9, further comprising sending the position measurement to a positioning server node.

16. The method according to claim 1, further comprising requesting the positioning node to determine the target device position.

17. The method according to claim 1, wherein a communication link between the first communication node and the target device comprises any one of GSM, 3G WCDMA, 3G/4G LTE, 5G NR, and WLAN communication links or any other short-range device-to-device D2D, BLUETOOTH-based communication link or side-link-based, Narrow Band Internet of Things (NB-IoT), Extended Coverage-Global System for Mobile Communications-Internet of Things (EC-GSM-IoT), or LORA and SIGFOX Radio Access Technologies (RATs).

18. The method according to claim 10, wherein the positioning unit comprises a GPS device or any other positioning device.

19. A first communication node for activation of a positioning procedure for a target device in a wireless communication network, the first communication node is configured to:
   determine whether the target device has moved and an amount of the movement; and
   activate a positioning procedure for the target device when the amount of the movement is larger than a threshold,
   wherein the first communication node is a network node or an eNodeB or gNode B, or an access point, and wherein the first communication node is configured to activate a positioning procedure for the target device by being configured to:
   inform a positioning node that a position measurement for the target device is needed,
   and wherein the first communication node is further configured to:
      receive information from the positioning node to transmit positioning pilots.

20. The first communication node according to claim 19, wherein the first communication node is configured to determine whether the target device has moved by being configured to:
   receive a signal from the target device; and
   determine whether the target device has moved based on characteristics of the received signal.

21. The first communication node according to claim 19, wherein the first communication node is any one of a relay node, a User Equipment, a wireless modem, and a machine type communications (MTC) device, and wherein to determine whether the target device has moved is based on any one of:
- a detected movement of the first communication node;
- a handover between cells or beams for the first communication node; or
- a relative position change between the first communication node and the target device.

22. The first communication node according to claim 19, wherein the first communication node is configured to activate a positioning procedure for the target device by being configured to:
- send a request from the first communication node to the target device to perform a positioning task.

23. The first communication node according to claim 22, wherein the positioning task comprises measuring the target device position by a positioning unit comprised in the target device.

24. The first communication node according to claim 22, wherein the positioning task comprises performing measurements on positioning pilots transmitted from one or more network nodes.

25. The first communication node according to claim 19, wherein the first communication node is configured to activate a positioning procedure for the target device by being configured to determine the target device position in the first communication node.

26. The first communication node according to claim 19, wherein the first communication node is further configured to send the position measurement to a positioning server node.

27. The first communication node according to claim 19, wherein the first communication node is further configured to request the positioning node to determine the target device position.

* * * * *